US010107470B2

(12) United States Patent
Mornet

(10) Patent No.: US 10,107,470 B2
(45) Date of Patent: Oct. 23, 2018

(54) DEVICE FOR POSITIONING A LIGHT SUPPORT FOR AN ELECTROLUMINESCENT DIODE ON A SUPPORT ELEMENT AND LIGHT MODULE FOR AN ILLUMINATION AND/OR SIGNALING DEVICE COMPRISING SUCH A DEVICE

(71) Applicant: Valeo Vision, Bobigny (FR)

(72) Inventor: Eric Mornet, Nogent sur Marne (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/178,864

(22) Filed: Jun. 10, 2016

(65) Prior Publication Data

US 2016/0363285 A1 Dec. 15, 2016

(30) Foreign Application Priority Data

Jun. 11, 2015 (FR) ...................................... 15 55334

(51) Int. Cl.

*B60Q 1/00* (2006.01)
*F21S 8/10* (2006.01)
*F21S 41/30* (2018.01)
*F21S 41/39* (2018.01)
*F21V 19/00* (2006.01)
*F21S 41/19* (2018.01)
*F21S 41/147* (2018.01)
(Continued)

(52) U.S. Cl.

CPC ........... *F21S 48/321* (2013.01); *F21S 41/147* (2018.01); *F21S 41/19* (2018.01); *F21S 41/30* (2018.01); *F21S 41/334* (2018.01); *F21S 41/39* (2018.01); *F21S 45/47* (2018.01); *F21S 45/49* (2018.01); *F21V 19/003* (2013.01); *F21V 19/0035* (2013.01); *F21Y 2115/10* (2016.08)

(58) Field of Classification Search

CPC ............... F21S 48/1104; F21S 48/1109; F21S 48/1159; F21S 48/13; F21S 48/1305; F21S 48/321; F21S 48/328; F21V 19/003; F21V 19/0035; F21Y 2115/10
USPC ........................................................ 362/358
See application file for complete search history.

(56) References Cited

U.S. PATENT DOCUMENTS 7,985,014 B2 * 7/2011 Tsukamoto ............. F21V 19/00 362/507
8,227,964 B2 7/2012 Choi et al.
(Continued)

FOREIGN PATENT DOCUMENTS

DE 102011081062 A1 2/2013
FR 3010488 A1 3/2015
(Continued)

*Primary Examiner* — Seung Lee
(74) *Attorney, Agent, or Firm* — Oblon, McClelland, Maier & Neustadt, L.L.P.

(57) ABSTRACT

A device for relative positioning of two parts formed by a light support for an electroluminescent diode and a support element of this light support, comprising two pairs of interlocking reliefs, each pair comprising at least one recess on one part and at least one locating projection with a rounded form, mounted on the other part, each locating projection being intended to rest, in the assembled position, each one on the bottom of the corresponding recess in a corresponding direction of insertion.
According to the invention, the positioning device is isostatic.

17 Claims, 6 Drawing Sheets

(51) Int. Cl.

| | |
|---|---|
| ***F21S 41/33*** | (2018.01) |
| ***F21S 45/49*** | (2018.01) |
| ***F21S 45/47*** | (2018.01) |
| *F21Y 115/10* | (2016.01) |

(56) References Cited

U.S. PATENT DOCUMENTS

| | | | | |
|---|---|---|---|---|
| 8,534,888 | B2 * | 9/2013 | Yasuda | F21S 48/1159<br>362/303 |
| 8,629,607 | B2 | 1/2014 | Choi et al. | |
| 9,605,826 | B2 * | 3/2017 | Cabanne | F21S 48/1109 |
| 2011/0234078 | A1 | 9/2011 | Choi et al. | |
| 2012/0275165 | A1 | 11/2012 | Choi et al. | |
| 2014/0226357 | A1 | 8/2014 | Brendle et al. | |
| 2015/0377439 | A1 * | 12/2015 | Madelaine | F21S 48/1109<br>362/516 |

FOREIGN PATENT DOCUMENTS

| | | | | |
|---|---|---|---|---|
| FR | 3012575 | A1 | 5/2015 | |
| JP | 2007141549 | A * | 6/2007 | F21S 48/1109 |

* cited by examiner

DEVICE FOR POSITIONING A LIGHT SUPPORT FOR AN ELECTROLUMINESCENT DIODE ON A SUPPORT ELEMENT AND LIGHT MODULE FOR AN ILLUMINATION AND/OR SIGNALING DEVICE COMPRISING SUCH A DEVICE

CROSS-REFERENCE TO RELATED APPLICATIONS

This application claims priority to the French application 1555334 filed Jun. 11, 2015, which application is incorporated herein by reference and made a part hereof.

BACKGROUND OF THE INVENTION

1. Field of the Invention

The invention relates to a device for positioning a light support for an electroluminescent diode on a support element and a light module for an illumination and/or signaling device comprising such a device.

2. Description of the Related Art

A light module intended in particular for a motor vehicle, such as that described in the patent document FR 3 010 488 comprises a light source associated with a radiating element fixed on a reflector, the reflector being arranged in contact with the light source for dissipating the radiation heat emitted by the latter during activation thereof. The light source is arranged substantially at the focal point of the reflector which is formed by several segments with a paraboloidal form.

The light source comprises advantageously an electroluminescent diode which is generally mounted directly on a printed circuit board connected to a power source and to control means.

The positioning of the light source in relation to the focal point of the reflector is an operation which requires a high degree of precision.

In order to achieve the positioning, it is known to arrange on an edge of the printed circuit board two semicircular recesses which, during assembly of the body of the radiating element on the reflector, cooperate by means of an interlocking fit with two locating projections provided on a locating wall of the deflector and have a corresponding semicircular rounded form, the recesses and rounded forms having substantially the same diameter.

Such a positioning device poses the problem of being hyperstatic. In fact, such positioning is performed with more constraints than that which is strictly necessary for maintaining the correct position, in other words at least one degree of mobility of the printed circuit is suppressed on several occasions.

As a result, the manufacture of the recesses and the cooperating projections must be performed with very small tolerances. More particularly, a lack of precision in the definition of the distance between these two recesses has the result of excessively modifying the relative positioning of the deflector and the light source.

SUMMARY OF THE INVENTION

In order to solve this problem, the invention proposes a device for positioning a light support for an electroluminescent diode on a support element, ensuring precise positioning of the light support for an electroluminescent diode on this support element, while requiring less strict manufacturing tolerances and therefore making manufacture of the device easier and less costly.

To this end, the invention proposes a device for relative positioning of two parts formed by a light support for an electroluminescent diode and a support element of this light support, comprising two pairs of interlocking reliefs, each pair comprising at least one recess on one the part and at least one locating projection with a rounded form, mounted on the other the part, each locating projection being intended to rest, in the assembled position, each one on the bottom of the corresponding recess in a corresponding direction of insertion, characterized in that the positioning device is isostatic.

According to particular embodiments, the device comprises one or more of the following characteristic features, considered singly or in all the technically possible combinations:

- the tangent to the bottom of one of the recesses is parallel to, for example aligned with, the tangent to the bottom of the other recess;
- at least one first recess arranged on an edge of the light support is semicircular, the second recess having a width greater than or equal to the diameter of this first recess, and the projections mounted on the support element have a semicircular form, at least one of the projections having a diameter smaller than the corresponding semicircular recess;
- the first projection has the same diameter as the corresponding semicircular recess and the second projection has a smaller diameter;
- the second recess also has a semicircular diameter equal to the diameter of the first recess;
- the difference between the diameter of the second recess and the diameter of the second projection is greater than or equal to 10% of the diameter of the second recess;
- the two recesses are arranged each on a corner of the light support and in the form of a circle quadrant, the projections having a semicircular form with the same diameter as the corresponding recesses;
- the distance perpendicular to the direction of insertion between the recesses is smaller than the distance perpendicular to the direction of insertion between the projections.

The invention also relates to a light module for an illumination and/or signaling device, the light support thereof for an electroluminescent diode being a printed circuit board comprising such a device.

These and other objects and advantages of the invention will be apparent from the following description, the accompanying drawings and the appended claims.

BRIEF DESCRIPTION OF THE ACCOMPANYING DRAWINGS

The invention is described below in greater detail with reference to the figures showing preferred embodiments of the invention.

Figure 1:
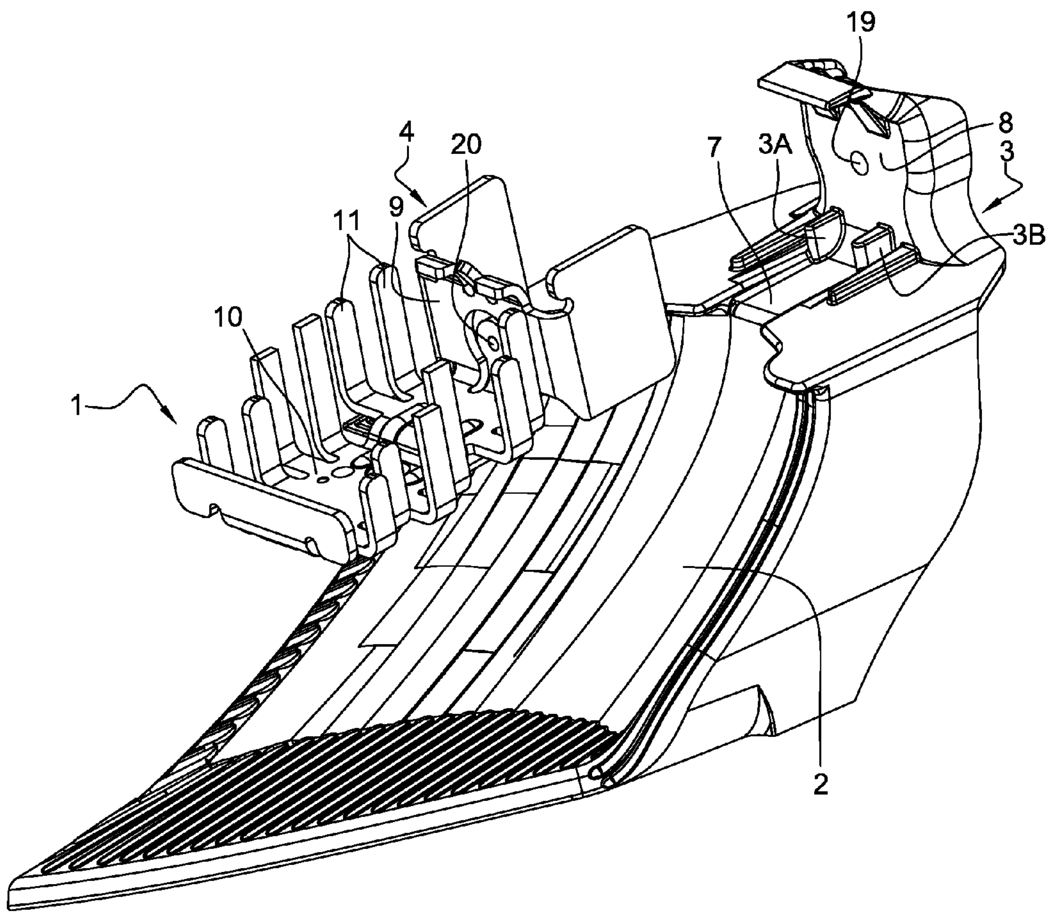
FIGS. 1 and 2 are perspective views of a light module for an illumination and/or signaling device according to a first embodiment of the invention, in the position before assembly and in the assembled position.
Figure 2:
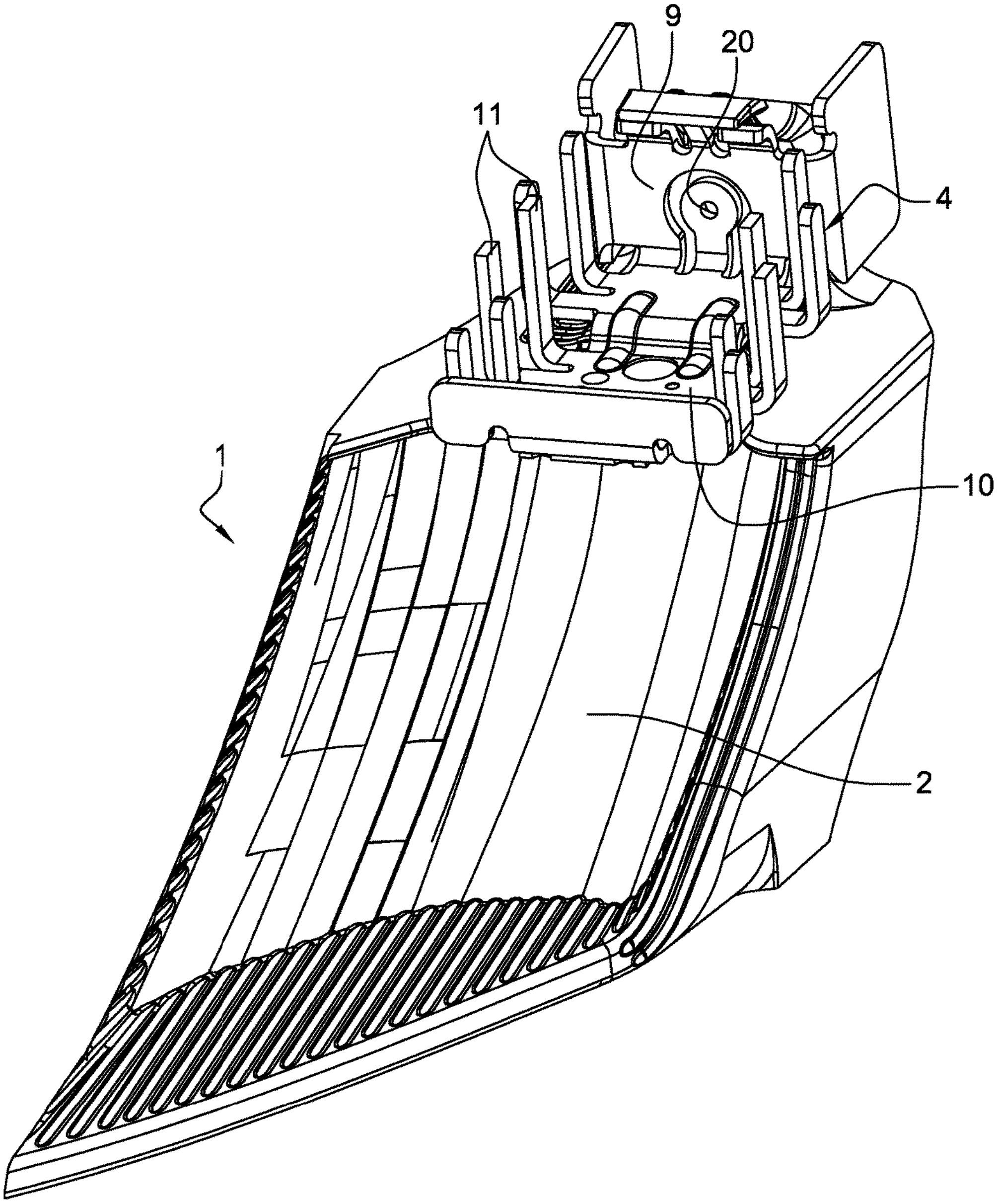

As shown in FIGS. 1 and 2, a reflector 1 of a light module has a reflecting surface 2 with, mounted on the top thereof, an L-shaped seat 3 adapted to receive a radiating element 4 underneath which a support or printed circuit board 5 for a light source, not visible in these two figures, is fixed.

The L-shaped seat 3 is composed of a surface 7 for receiving an outer side of the radiating element 4 provided with the support 5 for the light source, and a locating wall 8 extending substantially perpendicularly relative to the receiving surface 7. The locating wall 8 serves for positioning of the radiating element 4 and consequently also the support 5 with the light source in relation to the reflector 1.

For the positioning, the locating wall 8 is designed to cooperate with a contact wall 9 arranged at one of the ends of the radiating element 4 and extending substantially perpendicularly relative to the outer side of the radiating element 4. Moreover, the radiating element 4 comprises a radiating body 10 formed by a generally rectangular plate to which tongues 11 are connected so as to extend on either side of the radiating body 10.

The radiating element 4 provided with the support 5 for a light source is fixed onto the seat 3 of the reflector 1 by fixing means. These fixing means comprise a fixing hole 19 provided in the locating wall 8 of the seat 3. This fixing hole 19 is aligned with a fixing hole 20 provided in the contact wall 9 of the radiating element 4, so as to receive a fixing member in the form of a screw for fixing the radiating element 4 onto the seat 3 of the reflector 1.

Figure 3:
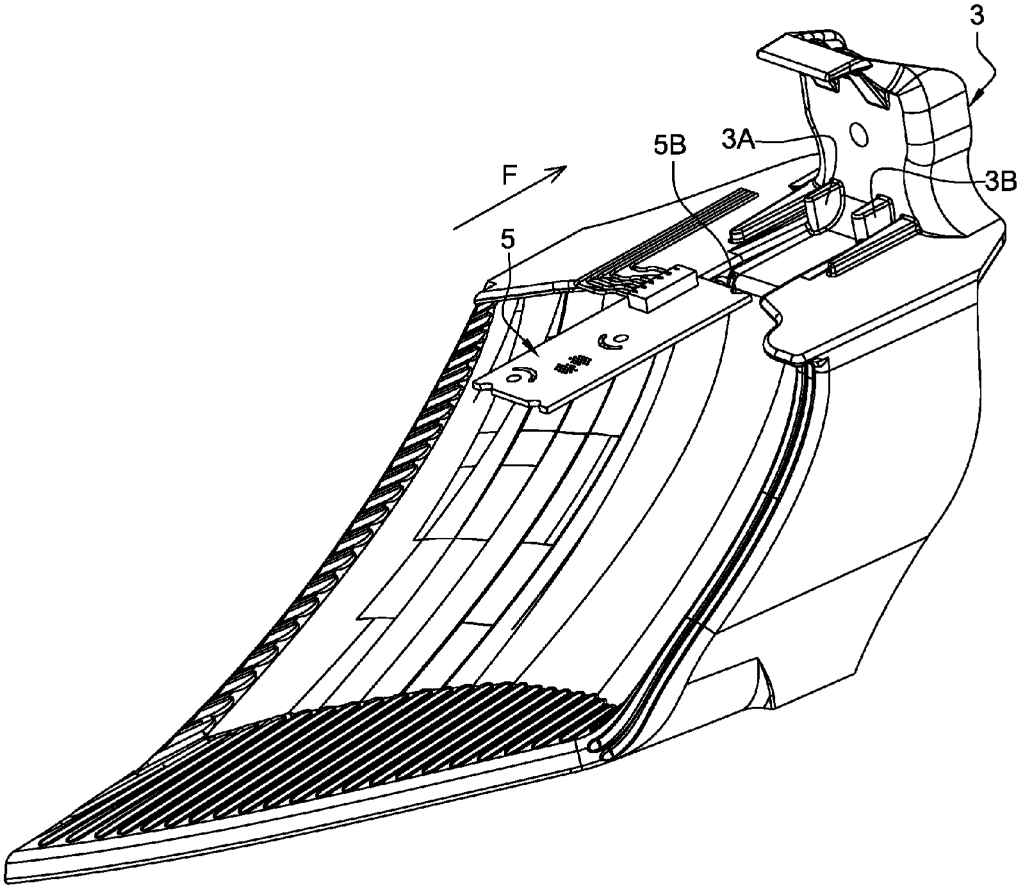
FIGS. 3 to 5 are partial perspective views from above of a device according to this first embodiment of the invention, in the position before assembly and in the assembled position
Figure 4:
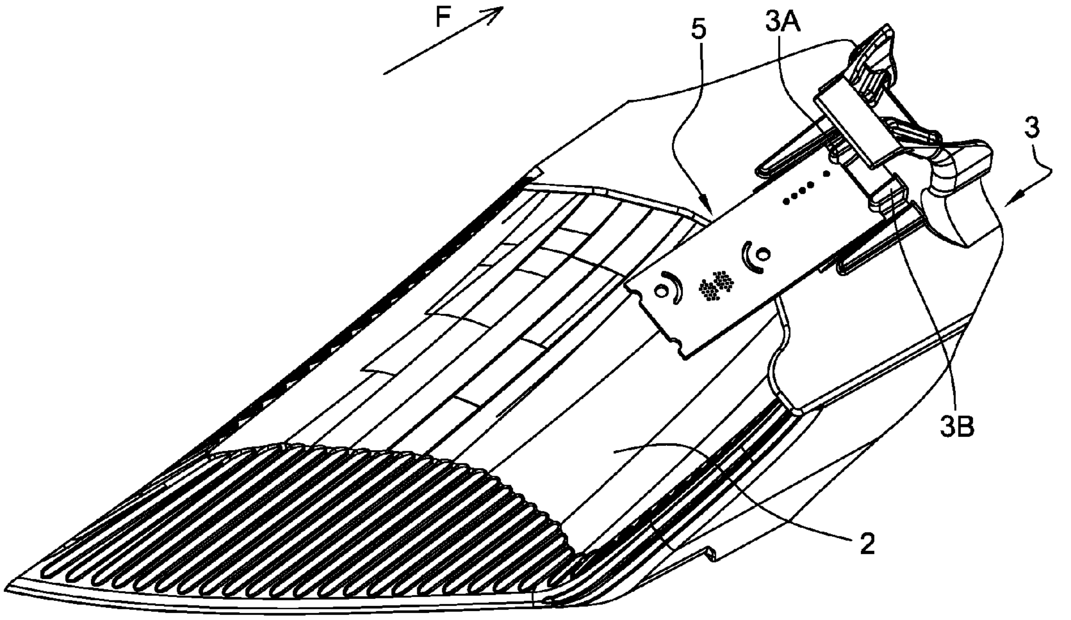
Figure 5:
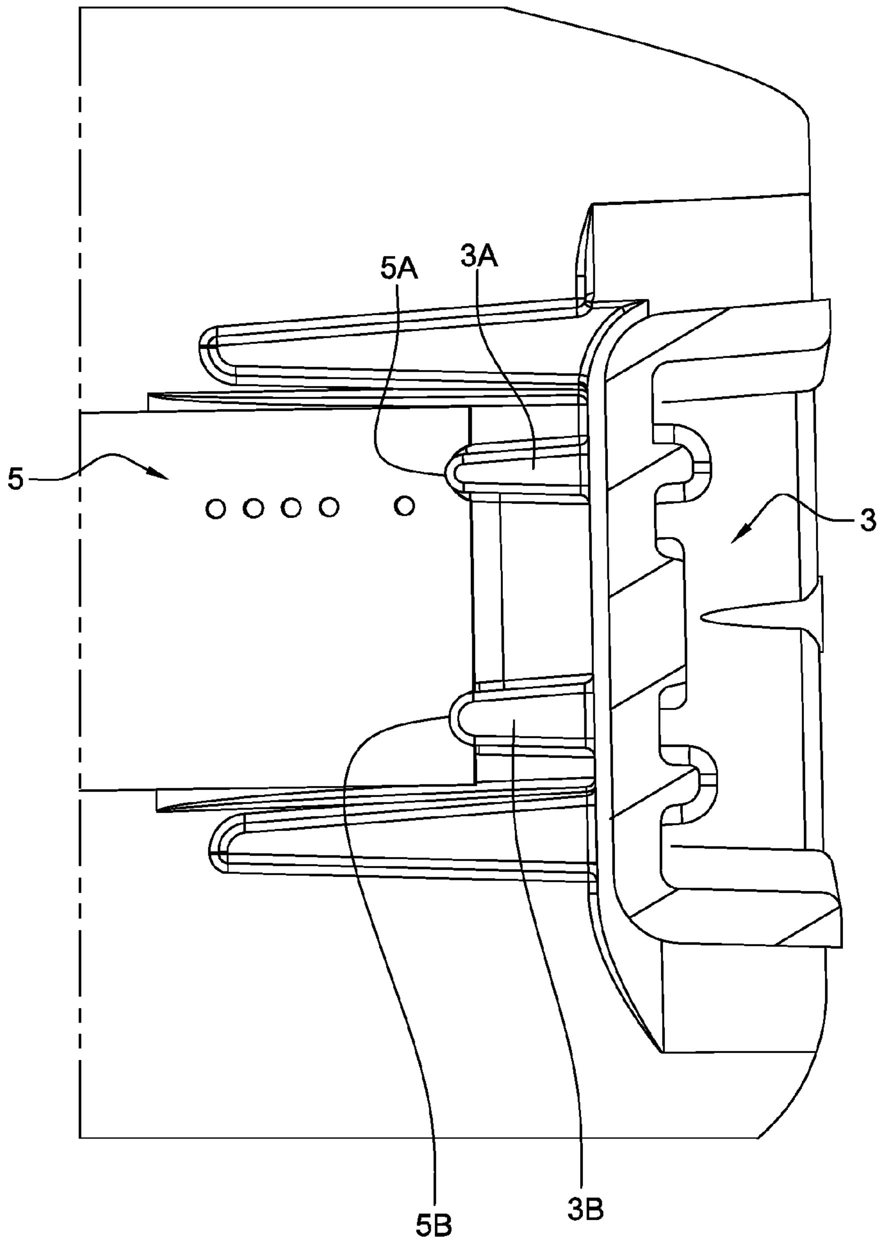

As can be seen in FIGS. 3 to 5, where the radiating element 4 is not shown, the light source is an electroluminescent diode fixed underneath the support 5 and this support 5 is a printed circuit board.

This first embodiment of the device for relative positioning of this printed circuit board 5 and the seat 3 will now be described in detail.

This device comprises two pairs of interlocking reliefs and more precisely each pair comprises a recess 5A, 5B on the printed circuit board 5 and a locating projection 3A, 3B with a rounded form mounted on the seat 3. Each projection 3A, 3B is intended to rest, in the assembled position shown in FIGS. 4 and 5, each projection 3A, 3B on the bottom of the corresponding recess 5A, 5B in a direction of insertion F.

According to the invention, this positioning device is isostatic.

The recesses 5A, 5B are arranged on an edge of the printed circuit board 5 and the tangent to the bottom of one of the recesses 5A, 5B is aligned with the tangent to the bottom of the other recess 5A, 5B. By way of a variant, the tangents are for example parallel and staggered.

The two recesses 5A, 5B are semicircular, with the same diameter, and the projections 3A, 3B mounted on the seat 3 have a semicircular shape, a first projection 3B having the same diameter as the corresponding semicircular recess 5B and the second projection 3A having a smaller diameter.

Advantageously, the difference between the diameter of the second recess 5A and the diameter of the second projection 3A is greater than or equal to 10% of the diameter of the second recess 5A. By way of example, the diameter of the second recess 5A is 3 mm and the diameter of the second projection 3A is 2 mm.

The invention also relates to variants of this first embodiment described.

For example, the tangent to the bottom of one of the recesses 5A, 5B may not be aligned with the tangent to the bottom of the other recess 5A, 5B, the projections 3A, 3B therefore having a suitable different length.

Furthermore, the projections 3A, 3B may be arranged on the printed circuit board 5 and the recesses 5A, 5B may be arranged on the seat 3.

The second recess 5A may not be semicircular and may for example be rectangular-shaped with a width greater than or equal to the diameter of the first recess 5B. The isostatic characteristic is ensured by locking of two degrees of freedom in the region of the stop formed by the first recess 5B and projection 5B, 3B and the locking of a second degree of freedom in the region of the stop formed by the second recess 5A and projection 5A, 3A.

A second embodiment of the device for relative positioning of this printed circuit board 5 and the seat 3 will now be described in detail.

Figure 6:
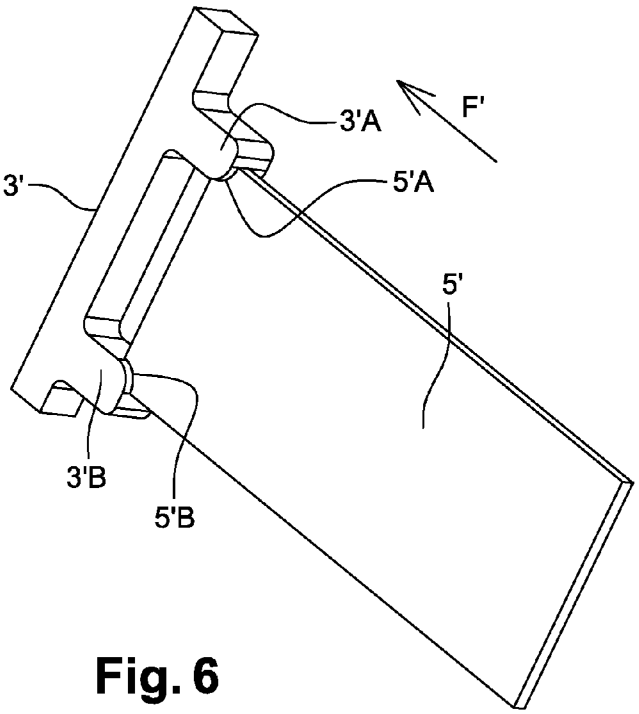
FIGS. 6 and 7 are schematic perspective views from above of a device according to a second embodiment of the invention.
Figure 7:
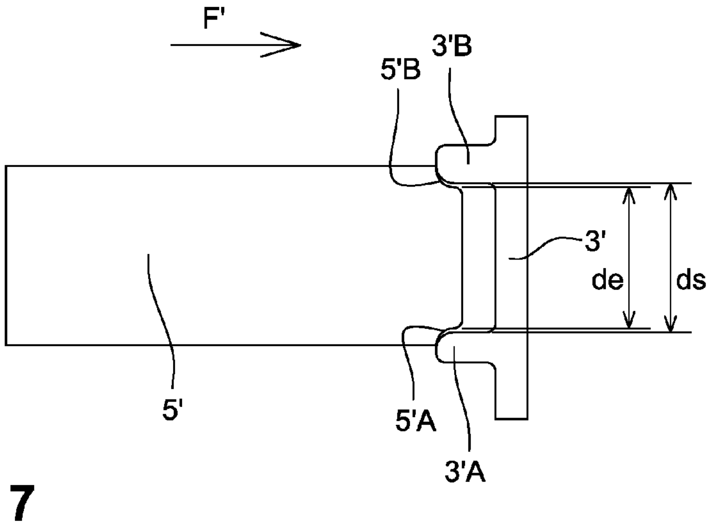

In FIGS. 6 and 7, only the light support 5' for an electroluminescent diode and the support element 3' of this light support are schematically shown.

The device for relative positioning of this printed circuit board 5' and the support element 3' comprises two pairs of interlocking reliefs and more precisely each pair comprises a recess 5'A, 5'B on the support 5' and a locating projection 3'A, 3'B with a rounded form mounted on the support element 3'. Each projection 3'A, 3'B is intended to rest on the bottom of the corresponding recess 5'A, 5'B in a direction of insertion F'.

According to the invention, this positioning device is isostatic.

The recesses 5'A, 5'B arranged each on a corner of the light support 5' are in the form of a circle quadrant and the projections 3'A, 3'B have a semicircular form with the same diameter as the corresponding recesses 5'A, 5'B.

The distance de perpendicular to the direction of insertion F' between the recesses 5'A, 5'B is smaller than the distance ds perpendicular to the direction of insertion F' between the projections 3'A, 3'B.

The invention is not limited to the embodiments described further above. In particular, generally speaking, the invention relates to a device for relative positioning of two parts formed by a light support for an electroluminescent diode and a support element of this light support.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A device for relative positioning of two parts formed by a light support for a semiconductor light source and a support element of said light support, wherein said device comprising two pairs of interlocking reliefs, each of said two pairs of interlocking reliefs comprising at least one recess on said part and at least one locating projection with a rounded form, mounted on the other said part, each of said at least one location projection being intended to rest, in an assembled position, on the bottom of said corresponding recess in a corresponding direction of insertion, said positioning device being isostatic, wherein at least one first recess arranged on an edge of said light support is semicircular, a second recess having a width greater than or equal to a diameter of said at least one first recess, and said locating projections mounted on said support element have a semicircular shape, at least one of said locating projections having a diameter smaller than said corresponding semicircular recess.

2. The device according to claim 1, wherein a tangent to said bottom of said at least one recess is parallel to, or aligned with, said tangent to said bottom of the other of said at least one recess.

3. The device according to claim 2, wherein a first of said at least one locating projection has the same diameter as said corresponding semicircular recess and a second of said at least one locating projection has a smaller diameter.

4. The device according to claim 2, wherein said second recess is also semicircular with a diameter equal to the diameter of said at least one first recess.

5. The device according to claim 2, wherein a difference between a diameter of said second recess and said diameter of said second of said at least one locating projection is greater than or equal to 10% of the diameter of said second recess.

6. The device according to claim 1, wherein a first of said at least one locating projection has the same diameter as said corresponding semicircular recess and a second of said at least one locating projection has a smaller diameter.

7. The device according to claim 6, wherein said second recess is also semicircular with a diameter equal to the diameter of said at least one first recess.

8. The device according to claim 7, wherein a difference between said diameter of said second recess and said diameter of said second of said at least one locating projection is greater than or equal to 10% of said diameter of said second recess.

9. The device according to claim 6, wherein a difference between said diameter of said second recess and said diameter of said second of said at least one locating projection is greater than or equal to 10% of the diameter of said second recess.

10. A light module for an illumination and/or signaling device comprising a device according to claim 1, wherein said device comprises:

a device for relative positioning of two parts formed by a light support for a semiconductor light source and a support element of said light support, wherein said device comprising two pairs of interlocking reliefs, each of said two pairs of interlocking reliefs comprising at least one recess on said part and at least one locating projection with a rounded form, mounted on the other said part, each of said at least one locating projection being intended to rest, in an assembled position, on the bottom of said corresponding recess in a corresponding direction of insertion, said positioning device being isostatic, wherein at least one first recess arranged on an edge of said light support is semicircular, a second recess having a width greater than or equal to a diameter of said at least one first recess, and said locating projections mounted on said support element have a semicircular shape, at least one of said locating projections having a diameter smaller than said corresponding semicircular recess.

11. A headlamp of a motor vehicle designed to project a light beam of a dipped beam type, comprising a light module according to claim 10, wherein said light module comprises an illumination and/or signaling device comprising a device for relative positioning of two parts formed by a light support for a semiconductor light source and a support element of said light support, wherein said device comprising two pairs of interlocking reliefs, each of said two pairs of interlocking reliefs comprising at least one recess on said part and at least one locating projection with a rounded form, mounted on the other said part, each of said at least one locating projection being intended to rest, in an assembled position, on the bottom of said corresponding recess in a corresponding direction of insertion, said positioning device being isostatic, wherein at least one first recess arranged on an edge of said light support is semicircular, a second recess having a width greater than or equal to a diameter of said at least one first recess, and said locating projections mounted on said support element have a semicircular shape, at least one of said locating projections having a diameter smaller than said corresponding semicircular recess.

12. A device for a lamp assembly for relative positioning of a light support having a light source on a support element, wherein said device comprises interlocking reliefs, said interlocking reliefs comprising at least one recess and at least one locating projection that is received in said at least one recess to cause said light support to be positioned and located on said support element and further causing said light source to be positioned in a predetermined position relative to a focus of a reflector in said lamp assembly:

wherein a first of said at least one locating projection has a same diameter as a mating one of said at least one corresponding semicircular recess and a second of said at least one locating projection has a smaller diameter.

13. The device according to claim 12, wherein a second recess of a second one of said at least one recess is also semicircular with a diameter equal to a diameter of at least one first recess.

14. The device according to claim 13, wherein a difference between said diameter of said second recess and said diameter of said second of said at least one locating projection is greater than or equal to 10% of said diameter of said second recess.

15. A light module for an illumination and/or signaling device comprising a device according to claim 12, wherein said device comprises:

a device for a lamp assembly for relative positioning of a light support having a light source on a support element, wherein said device comprises interlocking reliefs, said interlocking reliefs comprising at least one recess and at least one locating projection that is received in said at least one recess to cause said light support to be positioned and located on said support element and further causing said light source to be positioned in a predetermined position relative to a focus of a reflector in said lamp assembly.

16. A headlamp of a motor vehicle designed to project a light beam of a dipped beam type, comprising a light module according to claim 15, wherein said light module comprises an illumination and/or signaling device comprising a device for a lamp assembly for relative positioning of a light support having a light source on a support element, wherein said device comprises interlocking reliefs, said interlocking reliefs comprising at least one recess and at least one locating projection that is received in said at least one recess to cause said light support to be positioned and located on said support element and further causing said light source to be positioned in a predetermined position relative to a focus of a reflector in said lamp assembly.

17. The device according to claim 12, wherein a first of said at least one locating projection has the same diameter as said corresponding semicircular recess and a second of said at least one locating projection has a smaller diameter.

* * * * *